United States Patent
Doi et al.

(10) Patent No.: US 9,857,212 B2
(45) Date of Patent: Jan. 2, 2018

(54) THERMAL AIRFLOW SENSOR HAVING A DIAPHRAGM WITH A CAVITY OPENING ON THE BACK SIDE AND A SUPPORT MEMBER INCLUDING A COMMUNICATING HOLE

(71) Applicant: Hitachi Automotive Systems, Ltd., Hitachinaka-shi, Ibaraki (JP)

(72) Inventors: Ryosuke Doi, Hitachinaka (JP); Keiji Hanzawa, Hitachinaka (JP); Noboru Tokuyasu, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 213 days.

(21) Appl. No.: 14/408,012

(22) PCT Filed: Jun. 10, 2013

(86) PCT No.: PCT/JP2013/065914
§ 371 (c)(1),
(2) Date: Dec. 15, 2014

(87) PCT Pub. No.: WO2014/002738
PCT Pub. Date: Jan. 3, 2014

(65) Prior Publication Data
US 2015/0168195 A1    Jun. 18, 2015

(30) Foreign Application Priority Data
Jun. 29, 2012 (JP) ................................. 2012-146284

(51) Int. Cl.
*G01F 1/68* (2006.01)
*G01F 1/692* (2006.01)
(Continued)

(52) U.S. Cl.
CPC ............ *G01F 1/692* (2013.01); *G01F 1/6845* (2013.01); *G01F 5/00* (2013.01); *G01P 5/12* (2013.01)

(58) Field of Classification Search
CPC . G01F 1/68; G01F 1/696; G01F 1/692; G01F 1/6842; G01F 1/684; G01F 1/6845;
(Continued)

(56) References Cited

U.S. PATENT DOCUMENTS 7,004,198 B1 * 2/2006 Okandan ................. B01L 3/565
137/554
7,219,543 B2 * 5/2007 Tanaka .................. G01F 1/6845
73/204.22

(Continued)

FOREIGN PATENT DOCUMENTS

JP        6-196512 A        7/1994
JP     2003-234360 A        8/2003
(Continued)

OTHER PUBLICATIONS

International Search Report dated Jul. 16, 2013 with English translation (three (3) pages).

*Primary Examiner* — Lisa Caputo
*Assistant Examiner* — Brandi Hopkins
(74) *Attorney, Agent, or Firm* — Crowell & Moring LLP

(57) ABSTRACT

An object of the present invention is to provide a thermal airflow sensor with high detection accuracy. In achieving the above object, this invention provides a thermal flow sensor including: a flow rate detection element that has a diaphragm formed by processing a semiconductor substrate, a heating resistor provided on the diaphragm, and resistance temperature detectors installed upstream and downstream of the heating resistor; and a support member that adhesively holds the flow rate detection element with a sheet adhesive interposed therebetween. The support member includes a com- (Continued)

municating hole of which one end has an opening to a cavity provided on the back side of the diaphragm. The sheet adhesive has a ventilating hole formed in an opening area of the communicating hole in the support member.

9 Claims, 8 Drawing Sheets

(51) Int. Cl.
*G01F 1/684* (2006.01)
*G01F 5/00* (2006.01)
*G01P 5/12* (2006.01)

(58) Field of Classification Search
CPC .......... G01F 5/00; G01F 15/105; G01F 15/10; H01L 28/20; H01L 21/565; H01L 2924/1815; H01L 2224/49171; H01L 2224/05553; H01L 2224/48247; H01L 2924/00012; H01L 2924/00014; H01L 2924/10158; H01L 2924/181; H01L 35/34; G01P 5/12; F02D 41/182; F02D 41/187

USPC ............... 73/204.26, 204.18, 204.11; 438/55
See application file for complete search history.

(56) References Cited

U.S. PATENT DOCUMENTS

| | | | |
|---|---|---|---|
| 7,404,321 B2* | 7/2008 | Tanaka | G01F 1/6845 73/204.26 |
| 2005/0062121 A1 | 3/2005 | Toyoda | |
| 2009/0199632 A1* | 8/2009 | Toyoda | G01F 1/684 73/204.26 |
| 2012/0055245 A1* | 3/2012 | Doi | G01F 1/6845 73/204.11 |

FOREIGN PATENT DOCUMENTS

| | | |
|---|---|---|
| JP | 2008-20193 A | 1/2008 |
| JP | 2008-271426 A | 11/2008 |
| JP | 4265351 B2 | 5/2009 |

* cited by examiner

FIG. 1A
FIG. 1B
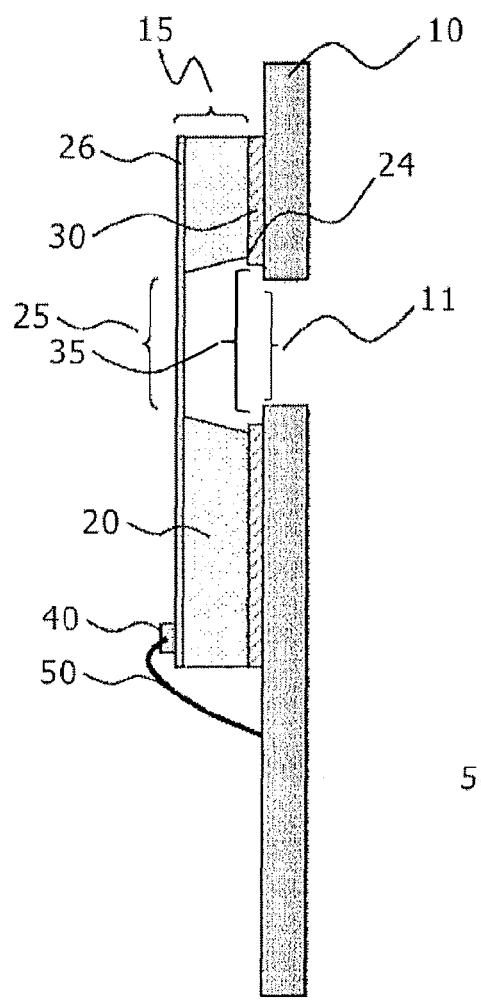
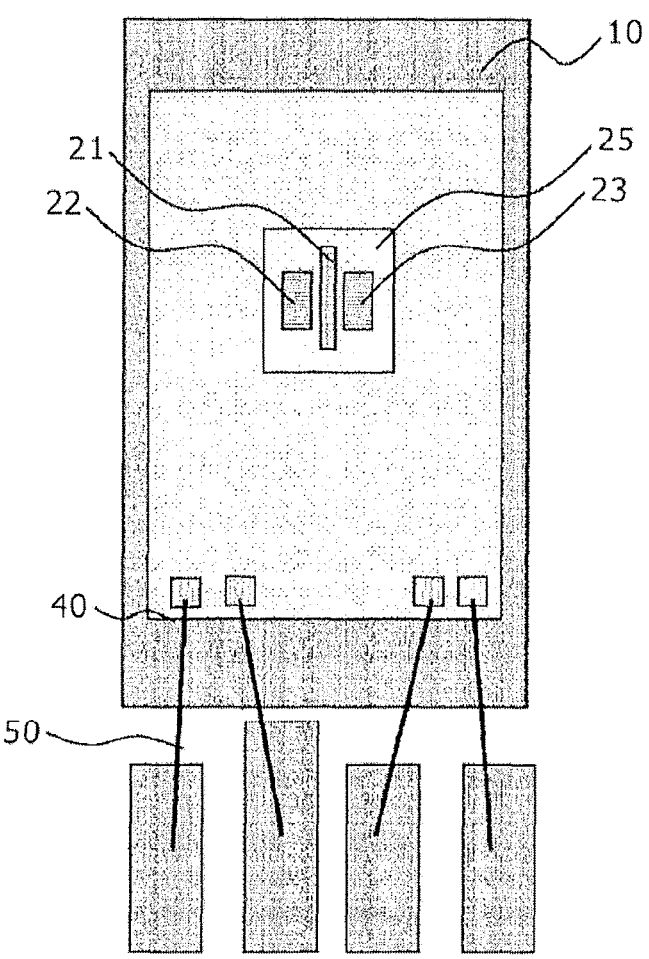

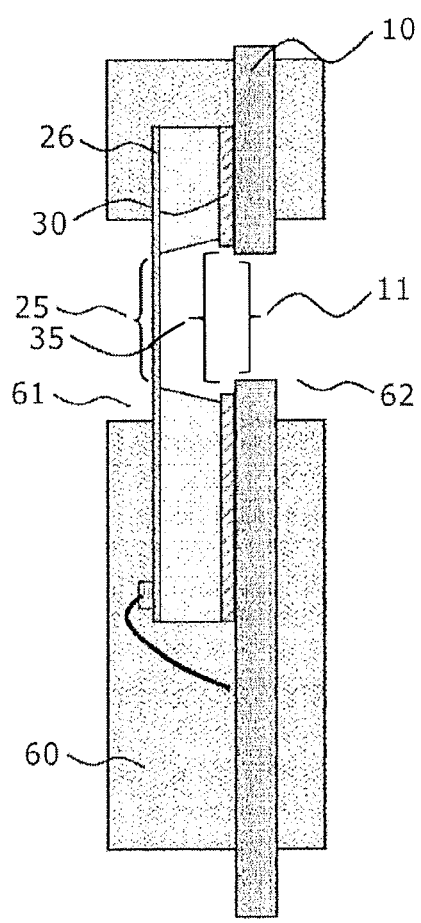
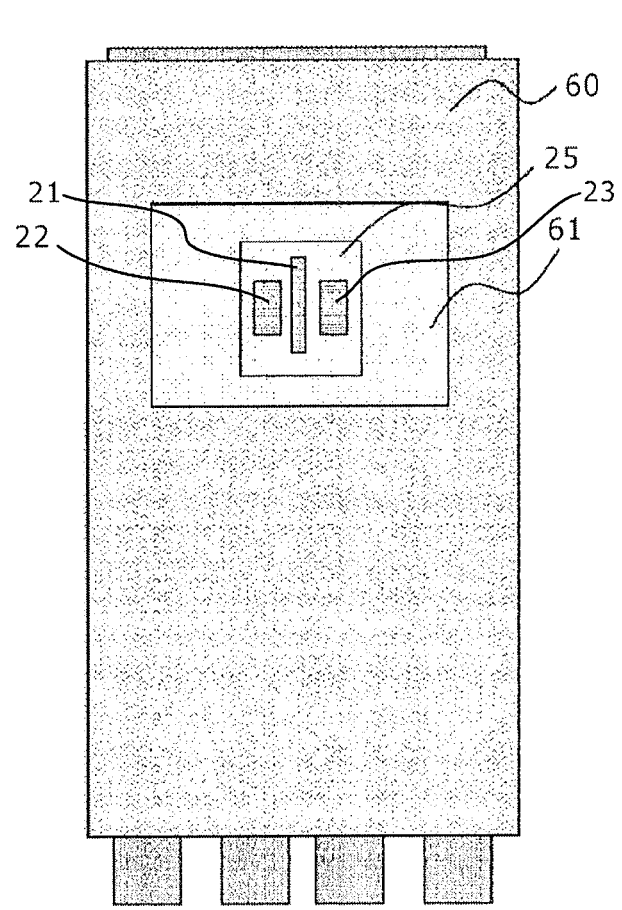
FIG. 2A
FIG. 2B

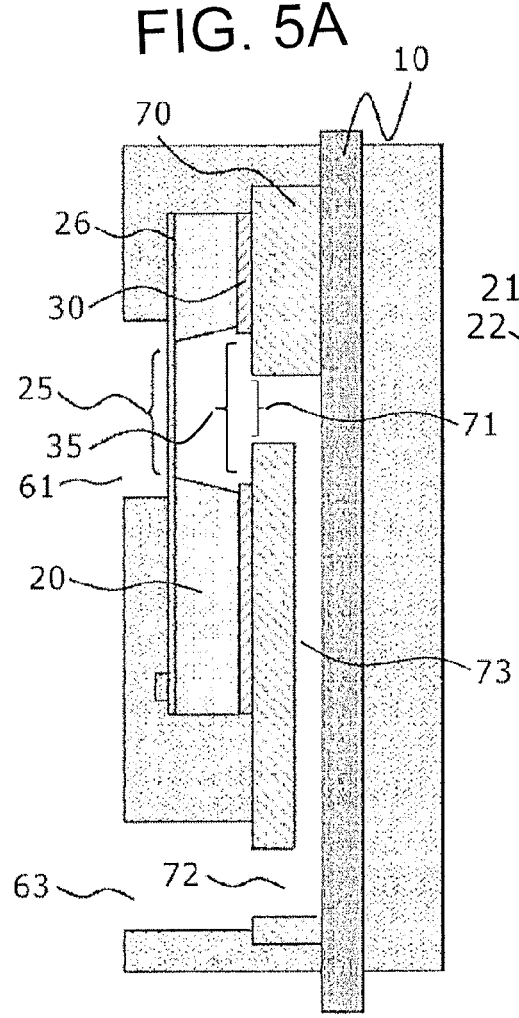
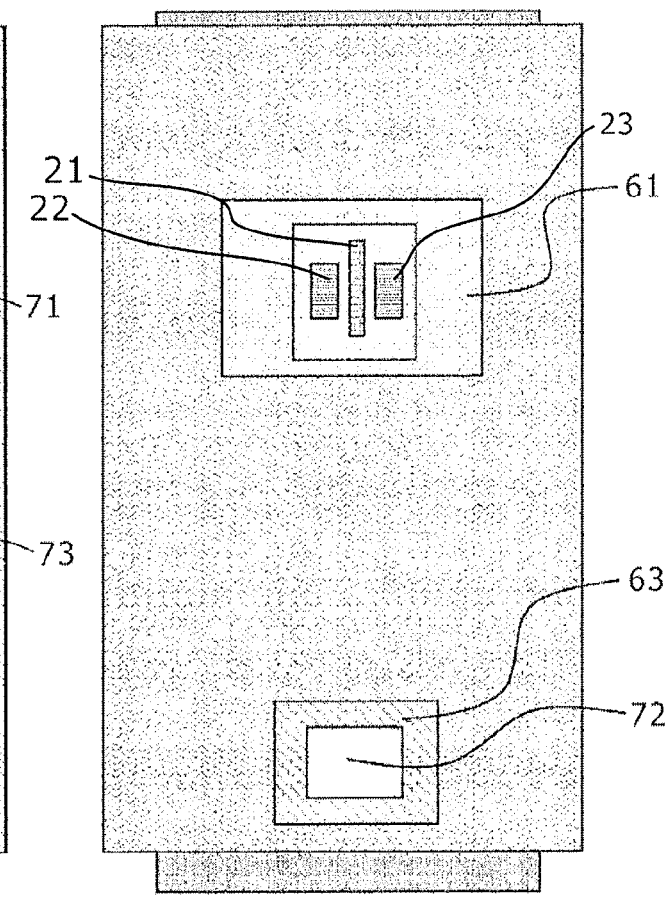

(SIZE AT 28)>(DIAMETER AT 35)
(DIAMETER AT 11)>(SIZE AT 36)
(DIAMETER AT 11)>(SIZE AT 37)

THERMAL AIRFLOW SENSOR HAVING A DIAPHRAGM WITH A CAVITY OPENING ON THE BACK SIDE AND A SUPPORT MEMBER INCLUDING A COMMUNICATING HOLE

TECHNICAL FIELD

The present invention relates to a thermal airflow sensor. More particularly, the invention relates to a thermal airflow sensor adapted to be installed in the intake system of the automobile engine to detect the intake air volume of the engine.

BACKGROUND ART

Thermal airflow sensors have conventionally been a mainstream airflow sensor that is installed in the intake air passage of internal combustion engines, such as those of automobiles, to measure intake air volume since the thermal airflow sensors are capable of directly detecting amount of air.

Recently, there has been developed an airflow sensor formed by having resistors and insulating layer films deposited on a silicon substrate by use of semiconductor micromachining technology, part of the silicon substrate being removed thereafter by a solvent represented by KOH to form a thin-wall portion. This airflow sensor is drawing attention because it has high-speed responsiveness and is capable of detecting counter flows thanks to its quick response. In recent years, for the purpose of reducing the number of components constituting the substrate portion (printed substrate, silicon substrate, etc.), study has been underway to prepare a resin package integrating a flow rate detection element and other components, the package being formed by mounting the flow rate detection element, circuit board, etc., on the same lead frame and by sealing the periphery of the frame in resin through the injection molding process.

Meanwhile, where semiconductor circuit elements such as LSI and microcomputers are to be sealed in resin, the circuit elements and the lead frame are often bonded together by use of sheet adhesive. The general method for using sheet adhesive involves pasting the sheet adhesive onto the back of the semiconductor circuit wafer and having both the wafer and the sheet adhesive layer cut into individual chips in the dicing process so that the entire backs of the semiconductor circuit chips will carry the diced sheet adhesive layer. As a result, the individual semiconductor circuit elements can be mounted as they are on the lead frame, which offers the advantage of eliminating the process of printing solvent over the elements as when a solvent-based adhesive is used.

The invention described in Patent Document 1 involves bonding an electronic element with a support substrate. Patent Document 1 discloses that multiple openings each having a predetermined area in planar view are formed in an electronic component adhesive sheet for fixedly bonding the electronic component with the mounting base. According to Patent Document 1, it is possible to prevent a convex formation caused by inclusion of air bubbles between the electronic component and the sheet adhesive being bonded together, which improves the adhesion between the mounting base and the electronic component.

PRIOR ART LITERATURE

Patent Document

Patent Document 1: JP-2003-234360-A

SUMMARY OF THE INVENTION

Problem to be Solved by the Invention

Where the flow rate detection element with a thin film portion formed thereon is mounted on the support substrate, if a cavity is sealed on the back of the thin film portion, the volume of the air sealed in the cavity on the back can vary along with temperature and pressure fluctuations, so that the than film portion may come to be deformed. In such a case, sensor characteristics may also vary, causing errors upon detection of airflow. In order to control the flow rate detection error, it is necessary to mount the flow rate detection element on the support substrate in such a manner that the cavity is not sealed on the back of the thin film portion.

However, the electronic component handled in Patent Document 1 is a block-type electronic component with its back unprocessed. Since Patent Document 1 describes the invention that bonds the block-type electronic component with the mounting base by use of a sheet adhesive, there is room for consideration in not sealing the cavity on the back of the thin-wall portion when the flow rate detection element with its back processed is so be mounted on the base.

An object of the present invention is to provide a thermal flow sensor with high detection accuracy.

Means for Solving the Problem

In achieving the above object of the present invention, there is provided a thermal flow sensor including: a flow rate detection element that has a diaphragm formed by processing a semiconductor substrate, a heating resistor provided on the diaphragm, and resistance temperature detectors installed upstream and downstream of the heating resistor; and a support member that adhesively holds the flow rate detection element with a sheet adhesive interposed therebetween. The support member includes a communicating hole of which one end has an opening to a cavity provided on the back side of the diaphragm. The sheet adhesive has a ventilating hole formed in an opening area of the communicating hole in the support member.

Effect of the Invention

According to the present invention, it is possible to provide a thermal flow sensor that offers high detection accuracy.

BRIEF DESCRIPTION OF THE DRAWINGS

In FIG. 1, FIGS. 1(a) and 1(b) are a schematic lateral sectional view and a schematic overhead view, respectively, of a first embodiment of the present invention.

In FIG. 2, FIGS. 2(a) and 2(b) are a schematic lateral sectional view and a schematic overhead view, respectively, of the first embodiment of the present invention.

In FIG. 4, FIGS. 4(a) and 4(b) are a schematic lateral sectional view and a schematic overhead view, respectively, of a second embodiment of the present invention.

In FIG. 5, FIGS. 5(a) and 5(b) are another schematic lateral sectional view and another schematic overhead view, respectively, of the second embodiment of the present invention.

In FIG. 7.

MODE FOR CARRYING OUT THE INVENTION

Figure 8:
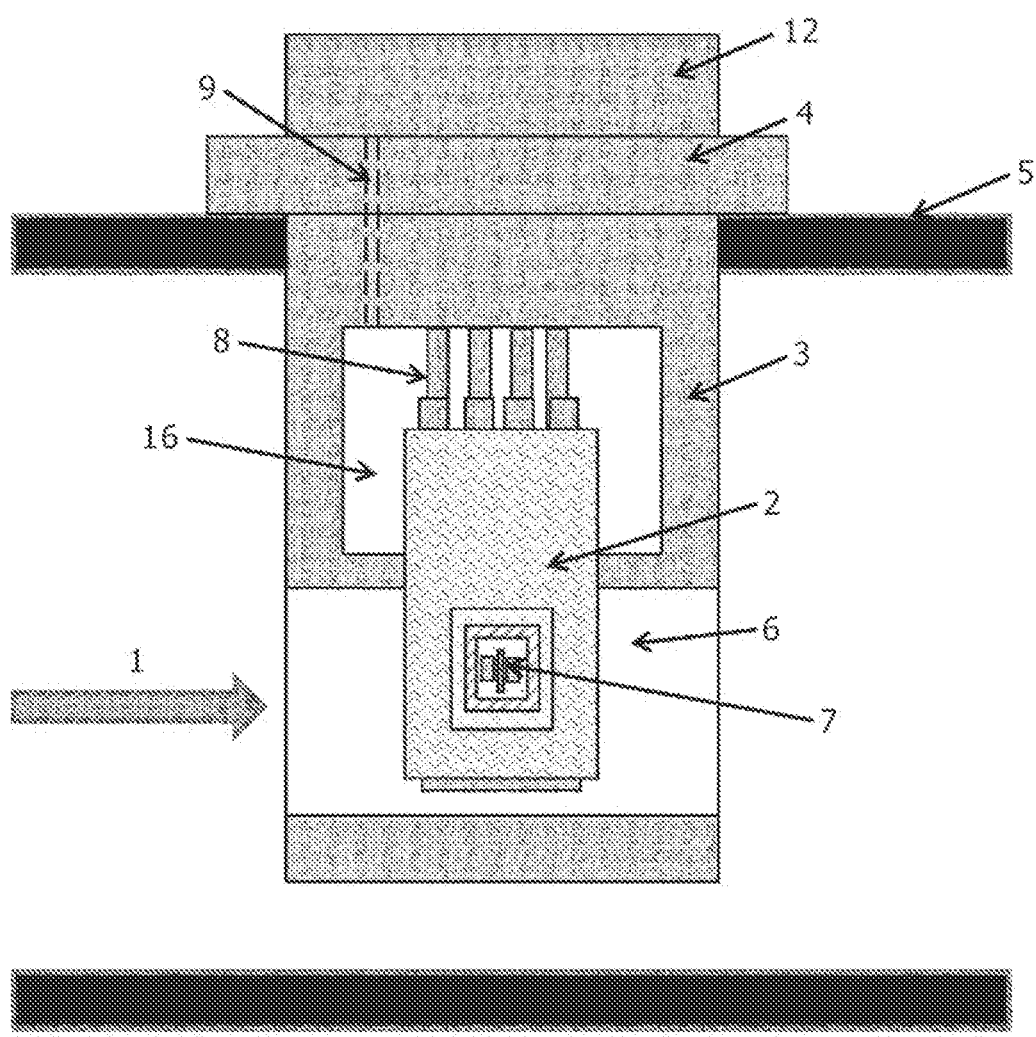
FIG. 8 is a structural view of a thermal flow meter according to the present invention.

The thermal airflow sensor according to the present invention will now be explained with reference to FIG. 8.

The thermal airflow sensor of the present invention includes a housing 3 and a semiconductor package 2 installed inside an intake pipe 5 that feeds intake air 1 to an automobile internal combustion engine (not shown).

The housing 3 includes a connector portion 12 coupled electrically to the outside, a circuit chamber 16 where circuits are installed, a flange portion 4 that fixes the housing 3 to the intake pipe 5, and an auxiliary passage 6 that admits part of the intake air 1.

The connector portion 12 has a connector terminal 8. One end of the connector terminal 8 extends to the circuit chamber 16 and is electrically coupled to the semiconductor package 2 inside the circuit chamber 16. The other end of the connector terminal 8 extends to a fitting part of the connector portion 12 and is coupled electrically to an external terminal.

The housing 3 is structured to have a communicating hole 9 that passes through a fitting part between the circuit chamber 16 and the connector portion 12. The communicating hole 9 connects the circuit chamber 16 to the outside of the intake pipe, thereby preventing the circuit chamber 16 from being hermetically sealed.

The semiconductor package 2 is formed by having a lead frame 10, a semiconductor substrate. 20, circuit elements, and a temperature sensor sealed integrally with a sealing resin 60. The semiconductor package 2 also has a partially exposed area (not covered with the resin 60) so as to expose a flow rate detection portion 7 to the intake air. The flow rate detection portion 7 is installed inside the auxiliary passage 6 and calculates the flow rate of the intake air 1 on the basis of the flow rate of a fluid flowing through the auxiliary passage 6.

Figure 3:
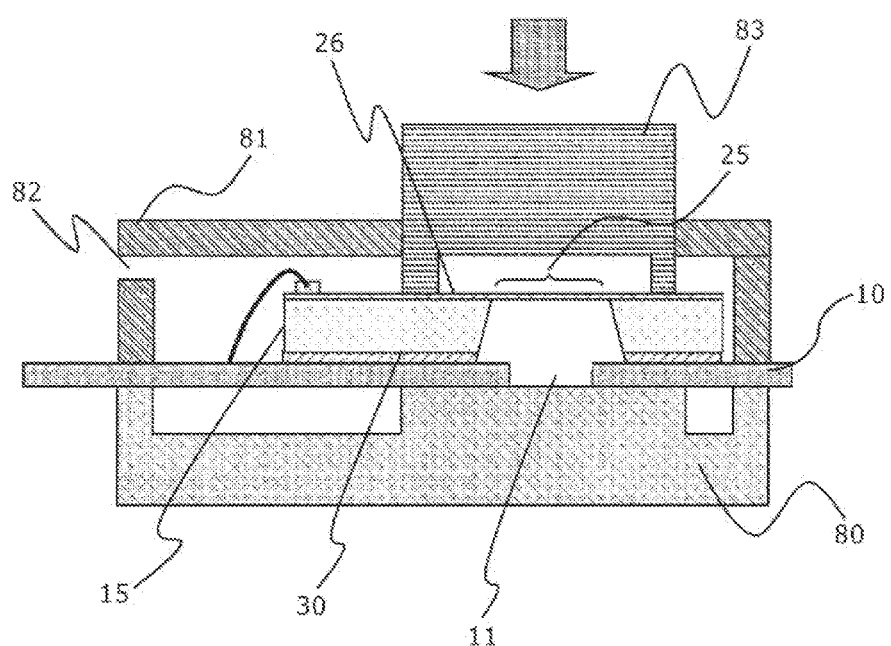
FIG. 3 is a schematic view of the first embodiment of the present invention.

The first embodiment of the present invention will now be explained with reference to FIGS. 1 through 3.

As shown in FIG. 1, a flow rate detection element 15 has a semiconductor substrate 20 typically made of silicon and deposited with a layered structure film 26 including an insulating film layer and a resistor layer. A diaphragm 25 is formed by removing part of the back side of the semiconductor substrate 20 typically by use of potassium hydroxide (KOH). A heating resistor 21, an upstream resistance temperature detector 22, and a downstream resistance temperature detector 23 are formed on the diaphragm 25. Also, an electrode pad 40 is formed on the surface of the semiconductor substrate 20. The electrode pad 40 is electrically coupled to the outside of the semiconductor substrate 20 by means of wire bonding 50 such as a gold wire. The flow rate detection element 15 is fixed to the lead frame 10 with a sheet adhesive 30.

A ventilating hole 11 is formed in the lead frame 10 for the purpose of ventilating a cavity on the back side of the diaphragm 25. A ventilating hole 35 is also formed in the sheet adhesive 30. The ventilating hole 35 is formed in an area where a diaphragm opening edge 24 of the sheet adhesive 30 matches the ventilating hole 11 formed in the lead frame 10, so that the cavity on the back side of the diaphragm 25 is made to communicate with the ventilating hole 11 formed in the lead frame 10.

In this manner, in the structure shown in FIG. 1, the cavity on the back side of the diaphragm 25 can communicate with external air via the ventilating holes 11 and 35.

Explained next with reference to FIG. 2 is a structure in which the structure of FIG. 1 is sealed with resin in a manner partially exposing an area that includes the diaphragm 25.

While the periphery of the structure in FIG. 1 is sealed with the sealing resin 60, an opening 61 is formed in the sealing resin 60 to partially expose the area that includes the diaphragm 25 serving as the flow rate detection portion. Formed on the opposite side of the opening 61 in the sealing resin 60 is an opening 62 that connects the ventilating hole 11 formed in the lead frame 10 to external air. Providing the opening 62 allows the back side of the diaphragm to communicate with external air and thereby averts a hermetically sealed state even where the flow rate detection element 15 and the lead frame 16 are sealed with the sealing resin 60.

When the flow rate detection element 15 and lead frame 10 are sealed with the sealing resin 60, the cavity formed on the back side of the diaphragm is hermetically sealed. Since the thermal airflow sensor installed in the intake system of the automobile is in an environment where temperature can fluctuate between −40 and 130 Celsius degrees, if air is sealed in a hermetic space, the sealed air may be thermally expanded in that environment and deform the diaphragm 25. If the diaphragm 25 is deformed, the resistance values of the heating resistor 21, upstream resistance temperature detector 22, and downstream resistance temperature detector 23 formed thereon will be changed and incur errors upon detection of flow rate. In this embodiment, the ventilating holes 11, 35 and 62 are respectively formed in the lead frame 10, sheet adhesive 30 and sealing resin 60 to let the back side of the diaphragm 25 communicate with external air. This makes it possible to control deformation of the diaphragm even when the thermal airflow sensor is exposed to high temperatures. Thus according to the present invention, detection errors caused by heat is controlled, and hence a thermal flow sensor with high detection accuracy is provided.

A method of sealing with resin will be explained next with reference to FIG. 3.

The semiconductor package 2 formed by having the flow rate detection element 15 and lead frame 10 sealed integrally with the sealing resin 60 is required to expose the diaphragm 25 directly to intake air, serving as a measurement medium, in order to detect airflow. The diaphragm 25 needs to be partially exposed from the sealing resin. 60 for the sake of exposure to the measurement medium. One method for implementing such exposure is as follows: the lead frame 10 incorporating the flow rate detection element 15 is sandwiched between a lower mold 80 and an upper mold 81. At this point, an insertion opening 82 is provided through which to inject the sealing resin, the insertion opening being disposed through either the lower mold 80 or upper mold 81. In order to form the opening 61, there is provided a structure in which an insertion die 83, which is a mold different from the upper mold 81, is inserted into the upper mold 81. An overhead load is applied to the insertion die 83 for close contact with the surface of the flow rate detection element 15.

Furthermore, the lower mold is provided with projections that prevent the sealing resin from flowing into the ventilating hole 11 formed in the lead frame 10. The projections and the lead frame 10 are brought into close contact with one another in an area including the ventilating hole 11 so as to form the opening 62. In this state, injecting the sealing resin 60 through the insertion opening 82 produces the semiconductor package shown in FIG. 2.

Figure 6:
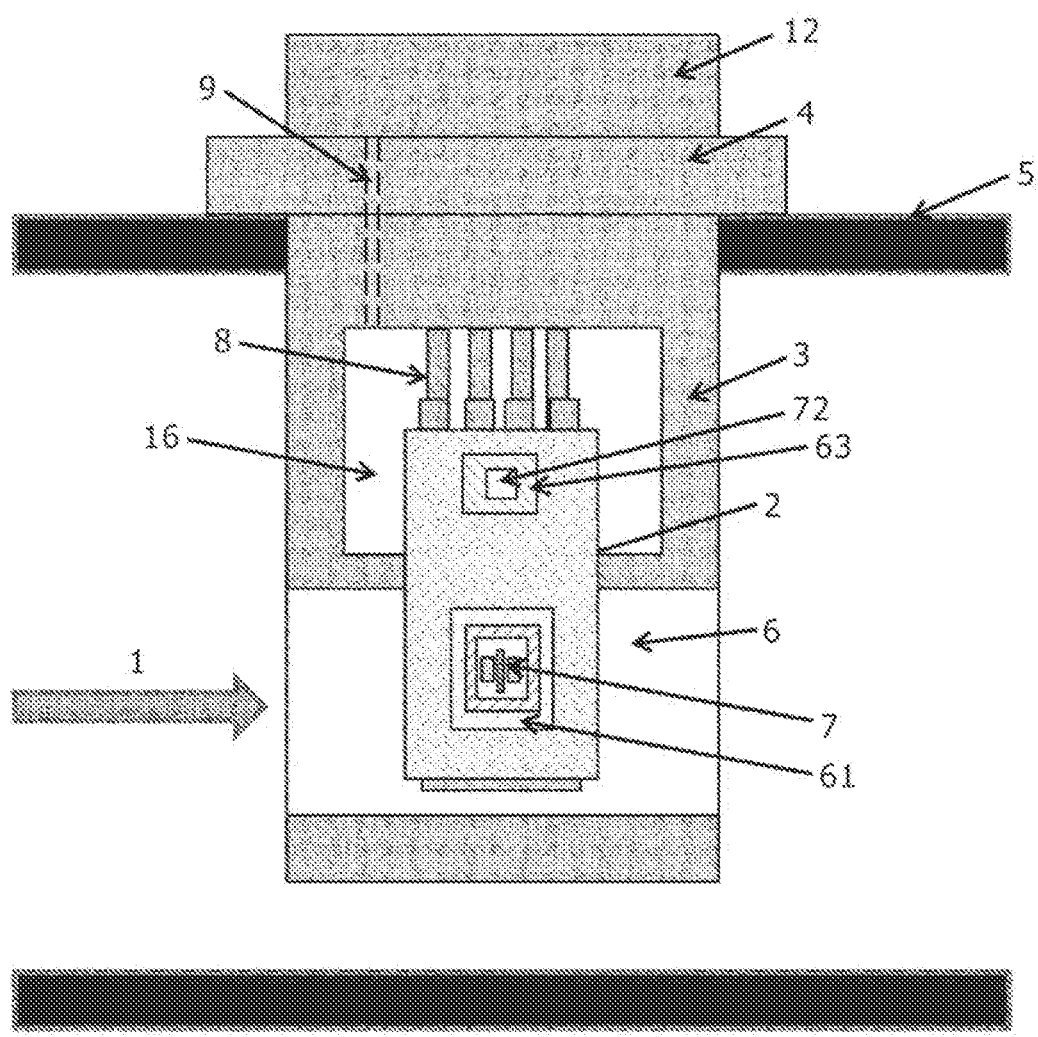
FIG. 6 is a structural view of a thermal flow meter that uses the second embodiment of the present invention.

The second embodiment of the present invention will be explained below with reference to FIGS. 4 through 6. The same structures as those of the first embodiment will not be discussed further.

Figure 4A:
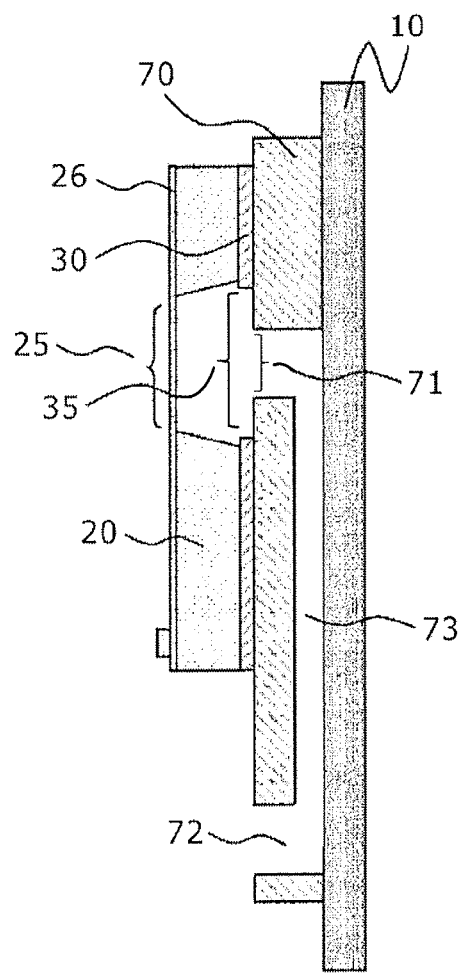
Figure 4B:
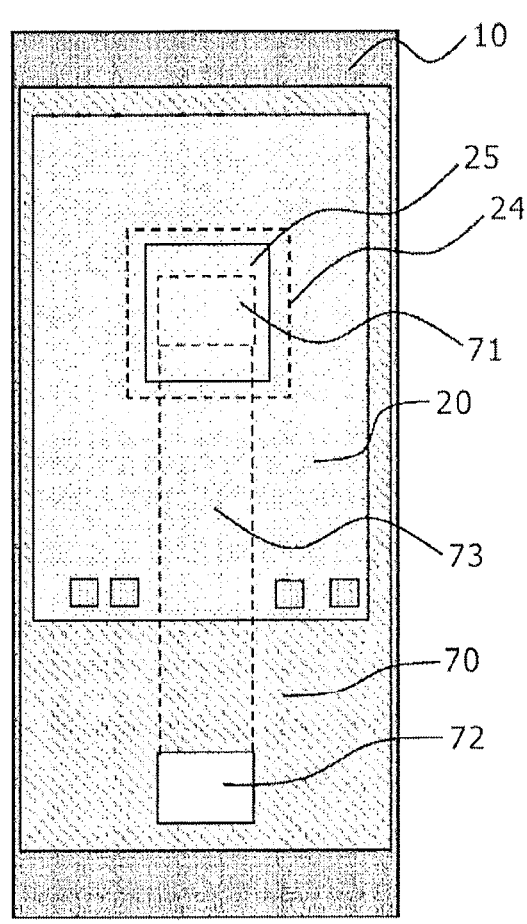

As shown in FIG. 4, the second embodiment of this invention has a substrate support member 70 interposed between the semiconductor substrate 20 and the lead frame 10. The semiconductor substrate 20 is bonded with the substrate support member 70 by use of the sheet adhesive 30. The substrate support member 70 has a ventilating hole 71 formed in a cavity area on the back side of the diaphragm 25, and a ventilating hole 72 formed on the same plane as where the ventilating hole 71 is provided, the plane corresponding to an area where the semiconductor substrate 20 is not provided. The sheet adhesive 30 has a ventilating hole 35 formed in a manner connecting the cavity on the back side of the diaphragm 25 to the ventilating hole 71 provided in the substrate support. Moreover, a trench 73 provided on the substrate support member 70 is combined with the lead frame 10 to form a communicating passage through which the ventilating holes 71 and 72 are made to communicate. The above-described structure prevents the cavity on the back of the diaphragm 25 from being hermetically sealed.

One advantage of this structure is that the cavity on the back side of the diaphragm is effectively prevented from being sealed hermetically where the opening 62 shown in FIG. 2 is sealed hermetically by another support member in contact with the semiconductor package 2, as when the back side of the semiconductor package 2 is bonded with the entire surface of that support member.

Whereas the above explanation with reference to FIG. 4 was regarding the structure in which the trench 73 is formed on the substrate support member 70, the same advantage is obtained also when the trench 73 is formed on the lead frame 10 so that the communicating passage may be formed by the substrate support member 70 and lead frame 10.

Explained next with reference to FIG. 5 is a structure in which an area that includes the diaphragm 25 is sealed in resin by use of the structure of FIG. 4 in such a manner that the area is partially exposed.

As shown in FIG. 5, the sealing resin 60 is provided with an opening 63 that connects the ventilating hole 72 formed in the substrate support member 70 to external air. This structure prevents the cavity on the back side of the diaphragm from being hermetically sealed when the flow rate detection element 15, lead frame 10, and substrate support member 70 are integrally sealed by use of the sealing resin 60, so that flow rate detection errors are controlled. In this manner, the second embodiment of the present invention provides a thermal flow sensor that offers high detection accuracy.

A thermal flow meter utilizing the second embodiment will be explained below with reference to FIG. 6.

The flow rate detection portion 7 is installed inside the auxiliary passage 6, and the ventilating hole 72 and the opening 63 are provided in the circuit chamber 16. The cavity on the back side of the diaphragm 25 is made to communicate with the circuit chamber 16 by way of the ventilating hole 35 formed in the sheet adhesive 30, the ventilating hole 71 provided in the substrate support member 70, a communicating passage formed by the substrate support member 70 and lead frame 10, the ventilating hole 72 provided in the substrate support member 70, and the opening formed in the sealing resin 60. Also, the circuit chamber 16 communicates with the outside of the intake pipe via the ventilating hole 9 provided in the housing 3. The above-described structure prevents the cavity on the back side of the diaphragm 25 from being hermetically sealed.

One advantage of the second embodiment is that the cavity on the back side of the diaphragm 25 is made to communicate not with the auxiliary passage where dust and other contaminants may flow but with external air outside the intake pipe by way of the circuit chamber 16. This prevents contaminants such as dust from flowing into the cavity on the back side of the diaphragm 25 so that the resistance to contamination is improved. And since the opening 63 and ventilating hole 72 are not clogged with dust, oil, etc., that may flow through the auxiliary passage, the reliability of the embodiment is enhanced.

The third embodiment of the present invention will be explained below with reference to FIG. 7.

Figure 7A:
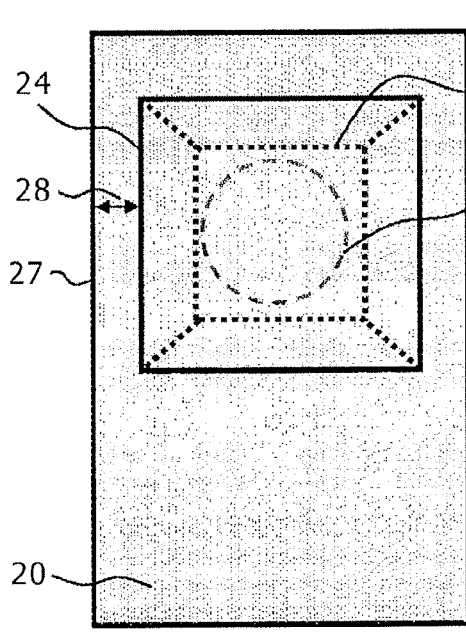
FIG. 7(a) is a schematic back side view of a flow rate detection element.
Figure 7B:
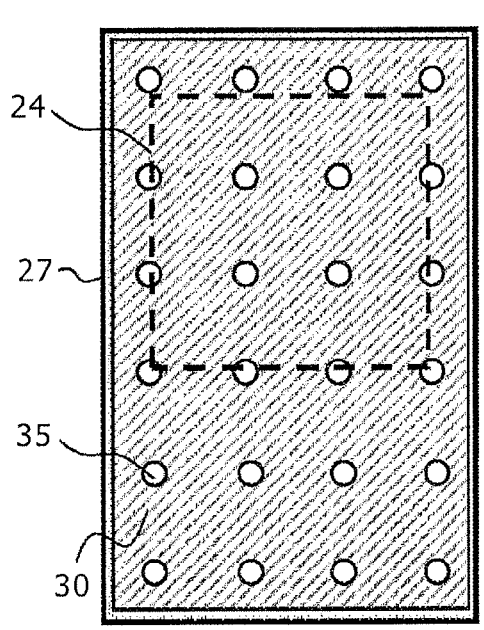
FIG. 7(b) is a schematic view of a sheet adhesive.
Figure 7C:
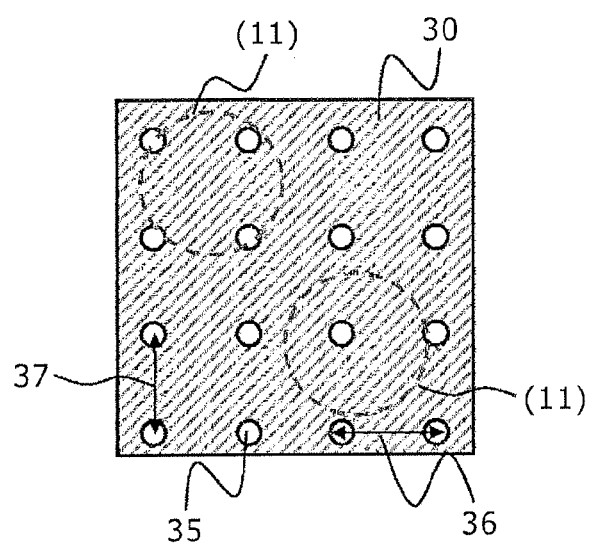
FIG. 7(c) is a schematic dimensional view of ventilating holes in a sheet adhesive, all the three regarding a third embodiment of the present invention.

FIG. 7(*a*) shows an external appearance of the semiconductor substrate 20 as seen from the back side. It is shown that in this embodiment, the ventilating hole 11 formed in the lead frame 10 is smaller than the opening shape on the back side of the diaphragm 25. In this case, the ventilating hole 11 provided in the lead frame 10 constitutes an area where the cavity on the back side of the diaphragm 25 is made to match the ventilating hole 11 for communicating purposes. That is, wherever the area of the ventilating hole 11 is located within the diaphragm back side opening edge 24, at least one ventilating hole needs to be provided in the sheet adhesive 30 in the area of the ventilating hole 11 so that the cavity on the back side of the diaphragm 25 will not be hermetically sealed.

As shown in FIGS. 7(*b*) and 7(*c*), the third embodiment of the present invention has a plurality of ventilating holes 35 formed in the sheet adhesive 30. A large number of ventilating holes 35 are provided at predetermined intervals (36, 37). Here, the predetermined intervals refer to the distance between the centers of two adjacent communicating holes. As described above, the ventilating holes 35 need to be provided in a manner connecting the cavity on the back side of the diaphragm to the ventilating hole 11 formed in the lead frame 10. Thus the longest of the predetermined intervals 36 and 37 is made smaller than the smallest of the region where the area of the diaphragm back side opening edge 24 matches the area of the ventilating hole 11 formed in the lead frame 10. The above structure allows at least one of the multiple ventilating holes 35 provided in the sheet adhesive 30 to be positioned in the area of the diaphragm back side opening edge 24. This makes it possible to prevent the cavity on the back side of the diaphragm 25 from being hermetically sealed.

The third embodiment of the present invention eliminates the need for positioning when the sheet adhesive 30 is to be bonded with the flow rate detection element and thereby simplifies the manufacturing process. That in turn prevents, at lower cost, the cavity on the back side of the diaphragm 25 from being, hermetically sealed. In this manner, the third embodiment of the present invention controls flow rate detection errors and provides a thermal flow sensor with high detection accuracy.

Moreover, the size of the ventilating hole 35 is configured to be smaller than the shortest interval 28 between the periphery 27 of the semiconductor substrate and the diaphragm back side opening edge 24. When the flow rate detection element 15 and other components are to be sealed with the sealing resin 60, if the ventilating hole size is excessively large, there can be a gap between the bonded surface of the flow rate detection element 15 and the lead frame 10, the gap connecting the cavity on the back side of the diaphragm 25 to the outside of the detection element 15. There is fear that the sealing resin 60 may leak to the back side of the diaphragm 25 through that gap. The above-described structure prevents such a communicating gap from being formed and thereby stops the sealing resin 60 from leaking to the cavity on the back side of the diaphragm 25. This in turn improves the reliability of resin molding.

When the sheen adhesive 30 of the third embodiment of the present invention is applied to the first and the second embodiments, the cavity on the back side of the diaphragm 25 can be hermetically sealed at low cost.

It should be noted that although the ventilating hole 35 in the first and the second embodiments of the present invention is assumed to be round for purpose of explanation, the shape of the hole may alternatively be a square, a rectangle, an ellipse, or some other suitable shape and the advantage is still the same.

REFERENCE NUMERALS

1 Intake air
2 Semiconductor package
3 Housing
4 Flange portion
5 Intake pipe
6 Auxiliary passage
7 Flow rate detection portion
8 Connector terminal
9 Ventilating hole
10 Lead frame
11 Ventilating hole.
12 Connector portion
15 Flow rate detection element
16 Circuit chamber
20 Semiconductor substrate
21 Heating resistor
22 Upstream resistance temperature detector
23 Downstream resistance temperature detector
24 Diaphragm back side opening edge
25 Diaphragm
26 Layered structure made of insulating film layer and resistor layer
27 Semiconductor device back side periphery
28 Smallest size between diaphragm back side opening edge and semiconductor device back side periphery
30 Sheet adhesive
35 Ventilating hole
36 Predetermined interval
37 Predetermined interval
40 Electrode pad
50 Bonding wire
60 Sealing resin
61 Opening
62 Opening
63 Opening
70 Substrate support member
71 Ventilating hole
72 Ventilating hole
73 Trench
80 Lower mold
31 Upper mold
82 Resin pouring hole
83 Insertion die

The invention claimed is:

1. A thermal flow sensor comprising:
a flow rate detection element that has a diaphragm formed by processing a semiconductor substrate, a heating resistor provided on the diaphragm, and resistance temperature detectors installed upstream and downstream of the heating resistor; and
a support member that adhesively holds the flow rate detection element with a sheet adhesive interposed therebetween, wherein the sheet adhesive is a solid sheet layer;
wherein the support member has a first ventilating hole for ventilating a cavity on a back side of the diaphragm and the support member has a second ventilating hole formed on a same plane as where the first ventilating hole is provided and a position of the second ventilating hole on the plane corresponding to where the semiconductor substrate is not provided, and a trench is provided on the support member to form a communicating passage through which the first and second ventilating holes communicate;
wherein the sheet adhesive has a third ventilating hole that is provided in an area where a diaphragm opening edge of the sheet adhesive matches the first ventilating hole of the support member; and
wherein the third ventilating hole is provided in the area of the sheet adhesive such that the cavity is configured to communicate with the the first ventilating hole.

2. The thermal airflow sensor according to claim 1, wherein a number of ventilating holes are formed at a predetermined interval all over the sheet adhesive.

3. The thermal airflow sensor according to claim 2, wherein a largest size of the ventilating holes formed over the sheet adhesive is smaller than a smallest size between a diaphragm back side opening edge on a back side of a semiconductor device and a back side periphery of the semiconductor device.

4. The thermal airflow sensor according to claim 3, further comprising a resin that integrally seals the support member and the flow rate detection element;
wherein the resin has a first opening that exposes the diaphragm, and a second opening that exposes the first ventilating hole.

5. The thermal airflow sensor according to claim 2, wherein the predetermined interval is smaller than the smallest size of a region in which an area of the diaphragm back side opening matches an area of the ventilating holes provided in the support member.

6. The thermal airflow sensor according to claim 1, wherein the support member is a lead frame.

7. The thermal airflow sensor according to claim 1, wherein the support member is adhesively bonded onto a lead frame.

8. The thermal airflow sensor according to claim 7, further comprising a resin that integrally seals the lead frame, the support member, and the flow rate detection element;
wherein the resin has a first opening that exposes the diaphragm, and a second opening that exposes the second ventilating hole provided in the support member.

9. The thermal airflow sensor according to claim 1, wherein a portion of the support member forming the communicating passage of the trench is thinner in width relative to other portions of the support member.

* * * * *